L. RHODES.
SPEED GOVERNOR.
APPLICATION FILED FEB. 3, 1912. RENEWED SEPT. 25, 1913.
1,081,865.
Patented Dec. 16, 1913.
2 SHEETS—SHEET 2.
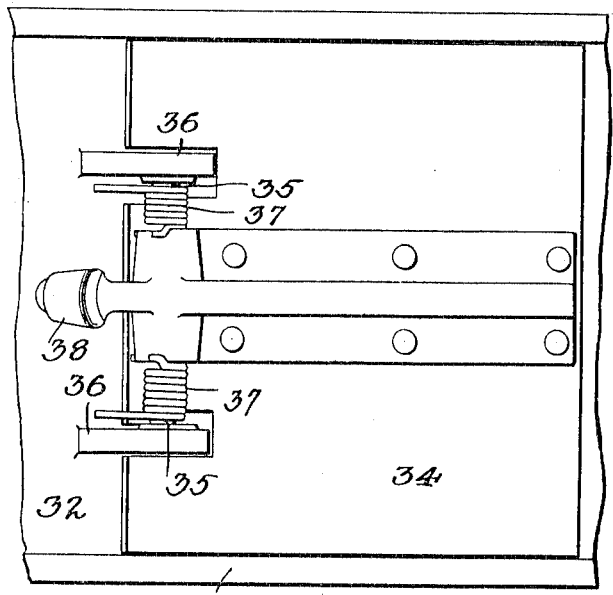
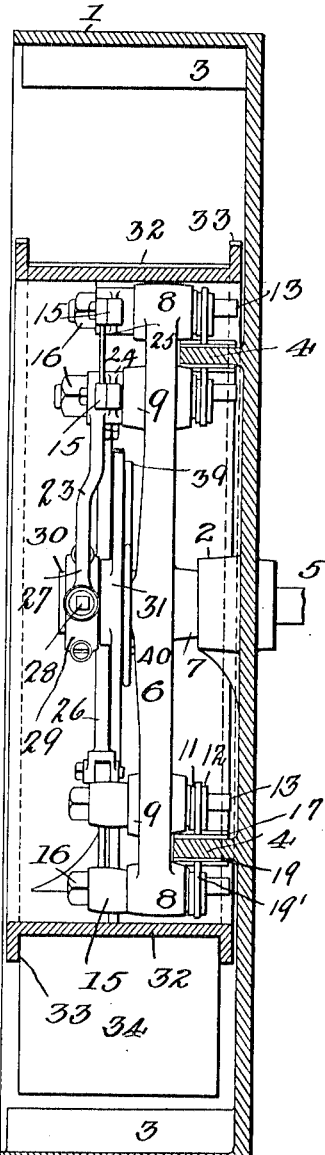
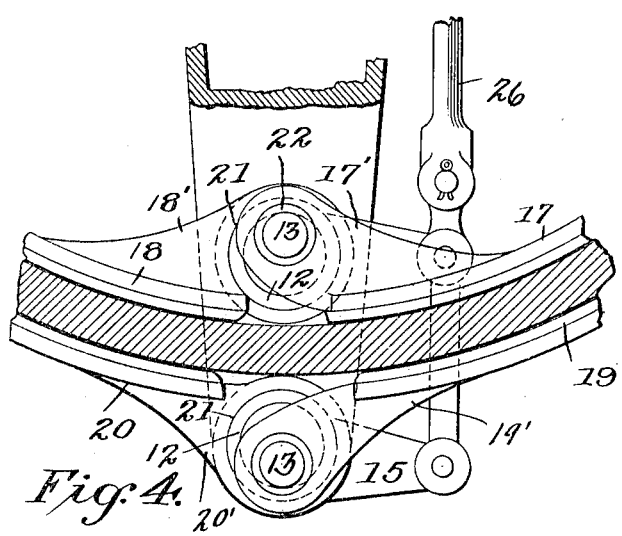
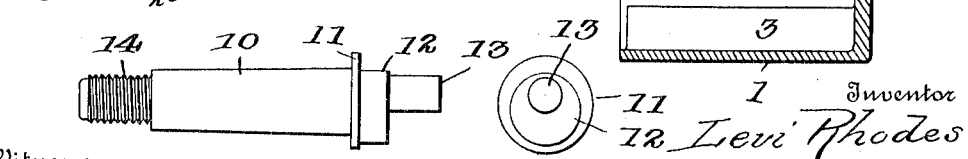

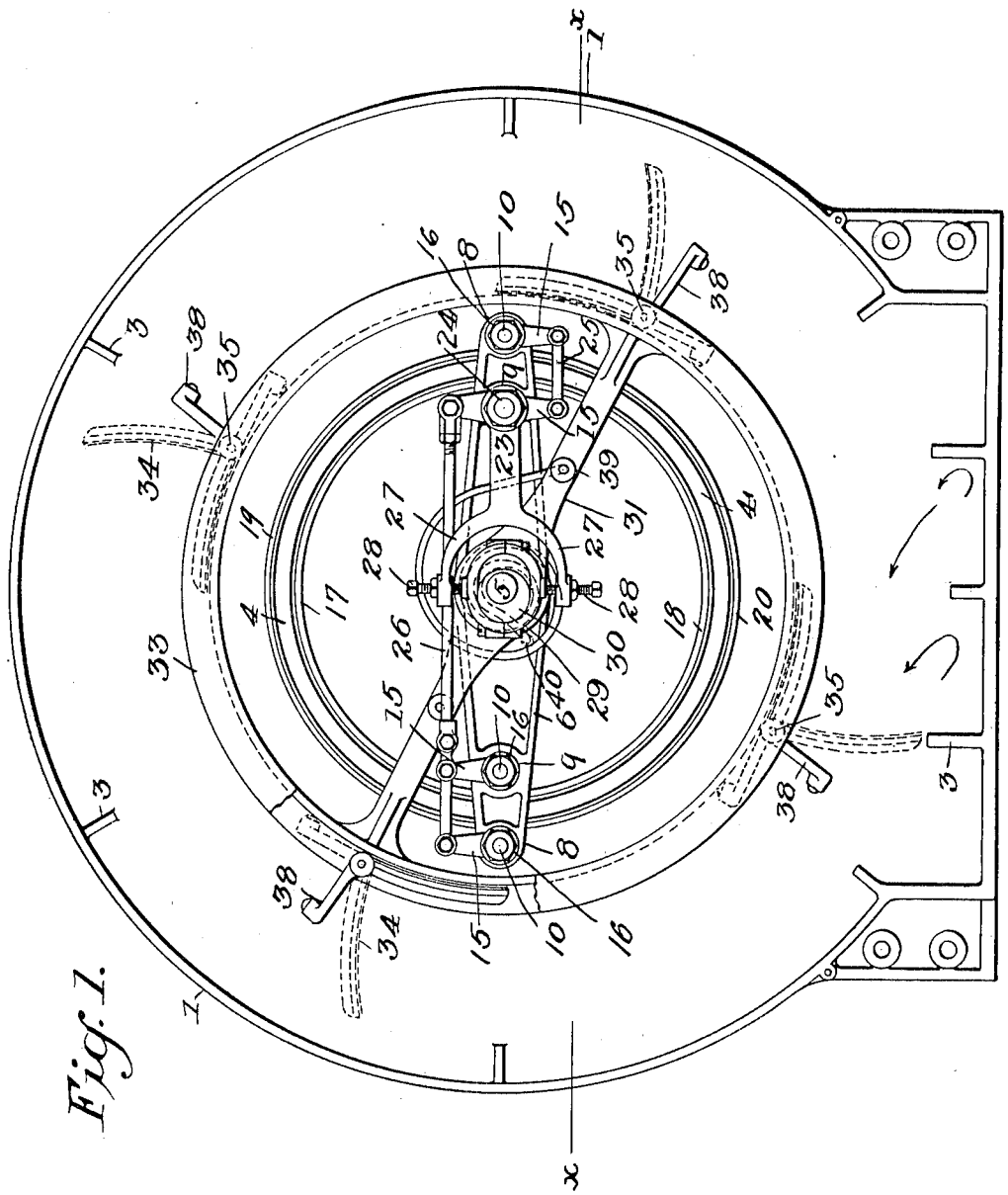

UNITED STATES PATENT OFFICE.

LEVI RHODES, OF SPOKANE, WASHINGTON.

SPEED-GOVERNOR.

1,081,865.  Specification of Letters Patent.  Patented Dec. 16, 1913.

Application filed February 3, 1912, Serial No. 675,258. Renewed September 25, 1913. Serial No. 791,859.

*To all whom it may concern:*

Be it known that I, LEVI RHODES, a citizen of the United States, residing at Spokane, in the county of Spokane and State of Washington, have invented certain new and useful Improvements in Speed-Governors, of which the following is a specification.

My invention relates to new and useful improvements in automatic speed governors designed for use in controlling the speed of gravity fire escapes, elevators and all such speed devices requiring operation at a uniform and predetermined speed, and the primary object of the invention is to provide a governor of this type so designed as to secure a high degree of efficiency in the control function thereof and to accomplish this in a manner to insure a smooth uniform motion in the operation thereof.

The invention also has for its object a construction that will be reliable at all times, durable and compact, and susceptible of a sensitive degree of adjustment and at the same time proof against derangement under all conditions of service.

With the above and other objects in view the invention consists in combining with a rotary governor element carrying friction devices for operation upon a friction rim, a wheel carrying fans adapted to be controlled by centrifugal force, the said rotary elements being yieldably connected to rotate together and to permit of a change in their speeds with relation to each other, and means whereby the friction devices will be operated through said relative change of speeds to produce friction in accordance therewith and maintain a substantially normal speed of rotation.

The invention also consists in certain other novel features in the arrangement and construction of parts, all as hereinafter described, and specifically set forth in the appended claims.

In the accompanying drawings, Figure 1, is a front view of the governor, the face plate of the casing being removed; Fig. 2, a vertical section view taken on the line *x—x* on Fig. 1; Fig. 3, an enlarged detail, showing a portion of the fan wheel and one of the fans attached thereto; Fig. 4, an enlarged detail, showing the underside of one end of the rotary element carrying the brake shoes, and illustrating the manner of connecting the inner and outer brake shoes; Fig. 5, an enlarged detail of one of the rock shafts for operating the brake shoes, and Fig. 6, an end view of one of the rock shafts.

Referring to the drawings, 1 designates a shallow circular case which not only incloses the governor but forms a mounting therefor, and is preferably a single casting of metal, provided with a cover or face plate (not shown), and cast with the shaft bearing 2, and the air arresting plates 3, disposed crosswise of the case at intervals around the inner circular walls thereof and extending inwardly sufficiently barely to escape contact with the revolving governor. Also cast with the case 1 on the inner wall thereof is an annular friction rim 4 arranged concentric to the shaft bearing 2.

Rigidly fixed upon the shaft 5, which is an extension from any suitable device to which the governor is applied, is a rotary element 6 in the form of a balanced beam provided with a hub or central bearing 7. This beam extends slightly beyond the friction rim at each end, and is provided at each end with vertically arranged bearings 8 and 9, arranged respectively on the outer and inner sides of the friction rim. Into each of these bearings 8 and 9 is fitted a rock shaft 10 as shown in Fig. 5, provided at its lower end with a collar 11 below which is formed a cam or eccentric portion 12 having a crank pin 13 projecting therefrom. At the upper end these rock shafts are formed with a tapered threaded, reduced portion 14 to receive crank arms 15 which are secured rigidly thereon by nuts 16. These rock shafts are the means for connecting to the rotary beam 6 the brake shoes or bands of which there is an inner pair 17 and 18 and an outer pair 19 and 20, and also form the means for expanding and contracting each pair against the friction rim. These brake shoes are more or less elastic and of semi-circular form, each pair conforming substantially to the friction surface of the rim 4 against which they are designed to bear. Each brake shoe is provided at its end with a flat portion or lug, designated respectively by the numerals 17', 18', 19' and 20', which lugs are adapted to overlap each other in pairs as shown, the upper lug having a bearing opening 21 to receive the eccentric 12, and the lower lug having a bearing opening 22 to receive and fit the crank pin 13, thus by the action of the eccentric portions 12 and 13 on the brake bands through the rocking of the rock shafts, each pair of brake shoes will be contracted or expanded according to the direction of rotation. As shown in the drawings the rock shafts for operating the inner shoes by rotation in one direction will expand the shoes against the friction rim, while the same movement or rotation of the rock shafts that operates the outer pair of brake shoes will act to draw them together tightly around the friction rim, and vice versa.

The four rock shafts shown, as will be seen especially by reference to Fig. 1, are connected up to operate in unison, a main operating lever 23 being connected rigidly with the rock shaft 24 which is provided with oppositely extending crank arms 15, one arm being connected by a link bar 25 to the arm of its adjacent rock shaft, and the other arm of rock shaft 24 connected to the arms of the rock shafts at the opposite end of the rotating beam by means of a link bar 26 which is so formed as to be capable of adjustment in its length, so that any undue wear of the parts may be provided against. The main operating lever 23 extends to the center of rotation and at that point is provided with a fork 27 in which is mounted on set screws 28 a yoke or eccentric strap 29, in which works an eccentric which governs the throw of said main lever to and from the medial line of the rotary beam element.

The eccentric 30 is formed on the hub 31 of a two spoke wheel carrying a rim 32 of substantially the width of the case 1, and is provided with inner and outer rim flanges 33 which extend outwardly and confine the fans 34 which are pivotally mounted on pintles 35 mounted in the lugs 36. These fans are adapted to lie against the rim 32 and are normally maintained thereagainst by the coil springs 37 shown in Fig. 3. The fans under the action of centrifugal force during rapid rotation of the fan wheel will open outward and present resistance on the air within the case, the currents of the air instead of being carried around the case without obstruction, being arrested by the baffles or plates 3 which resist to a great extent the air currents thereby increasing the efficiency as a retarding agency to the fan wheel. Each fan is provided with a stop arm 38 which limits the outward swing of the fan and assists by centrifugal action thereon to increase the efficiency of the retracting spring.

The fan wheel is mounted to rotate independently of the rotary element carrying the brake shoes but in order that these two rotary elements may rotate together but admit of a relative retarding action between them a stiff convolute spring is attached to a spoke of the fan wheel at 39 and after making several coils is secured at its other end to the hub of the brake carrying element 6 at the point 40. Thus this torsion spring will permit of a fan wheel changing its relation to the brake carrying element under the retarding action of the fan wheel, which action is in proportion to the rate of speed at which the governor revolves, and this change in relationship of said rotary elements causes the eccentric 30 which rotates with the fan wheel, to rotate within the strap 29 thus throwing the main operating lever in or out according to the position of the eccentric and thus imparting to the rock shafts a corresponding degree of movement. The torsion spring tensioned by the retarding movement of the fan wheel promptly reacts to relieve the friction devices the moment the speed of rotation reaches the normal.

Thus it will be seen from the foregoing that by a simple and compact construction that there has been provided a governor with a rotary controlling element which operates in a gradual and effective manner on an elastic and resisting body of air and being itself under the control of centrifugal force after a predetermined speed of rotation has been reached.

What I claim is:—

1. An automatic speed governor, comprising a rotary shaft, a supporting element rotated thereby and carrying one or more brake shoes, a stationary friction rim, a fan wheel yieldably connected to said supporting element, and means for controlling the pressure of the brake shoes on the friction rim, operated by the variation in the speed of the fan wheel with relation to the speed of rotation of said brake shoe supporting element, substantially as described.

2. An automatic speed governor, comprising a rotary shaft, a supporting element rotated thereby and carrying one or more brake shoes, a stationary friction rim, a rotatable element yieldably connected to said supporting element, means for retarding said rotary element, controlled by centrifugal force, means for applying pressure to the brake shoes, and means for controlling said pressure means operated by and responsive to the variation in speed between said rotary element and the brake carrying element, substantially as described.

3. An automatic speed governor, comprising a rotary shaft, a supporting element rotated thereby and carrying one or more brake shoes, a stationary friction rim, a rotary element yieldably connected to said supporting element, retarding fans carried by said rotary element and controlled by centrifugal force, means for placing said fans under a retracting pressure, means for applying pressure to the brake shoes, and means for controlling said pressure means operated by and responsive to the variation in speed between the element carrying the brake shoes and the element carrying the fans, substantially as described.

4. An automatic speed governor, comprising a rotary shaft, a supporting element rotated thereby and carrying one or more brake shoes, a stationary friction rim, a rotary element yieldably connected to said supporting element to rotate therewith and permit a change of relationship during rotation, retarding fans carried by said rotary element, controlled by centrifugal force, means for placing said fans under a retracting pressure, means for applying pressure to the brake shoes, and means for controlling said pressure means, operated by and responsive to variation in speed between the brake carrying element and the fan carrying element, substantially as described.

5. An automatic speed governor, comprising a rotary shaft, a supporting element rotated thereby and carrying one or more brake shoes, a stationary friction rim, a fan wheel yieldably connected to said supporting element, an inclosing case for confining the air surrounding the fan carrying element, and means for controlling the pressure of the brake shoes on the friction rim, operated by the variation in the speed of the fan wheel with relation to the speed of rotation of said brake shoe supporting element, substantially as described.

6. An automatic speed governor, comprising a rotary shaft, a supporting element rotated thereby and carrying one or more brake shoes, a stationary friction rim, a fan wheel yieldably connected to said supporting element, an inclosing case for confining the air surrounding the fan carrying element, said case being provided with a plurality of baffle plates for obstructing the current of air formed therein by the fans, and means for controlling the pressure of the brake shoes on the friction rim, operated by the variation in the speed of the fan wheel with relation to the speed of rotation of said brake shoe supporting element, substantially as described.

7. An automatic speed governor, comprising a rotary shaft, a supporting element rotated thereby and carrying one or more brake shoes, one or more rock shafts mounted in said support, each having an eccentric for operating on its respective brake shoe, a main operating lever for said rock shaft or shafts, a friction rim, a rotatable element yieldably connected to said supporting element, and means carried by said rotary element adapted to engage main lever and impart movement thereto according to the variation in speed between said rotary element and said brake carrying element, whereby the pressure on the brake shoes will be controlled by the said variation of speed, substantially as described.

8. An automatic speed governor, comprising a rotary shaft, a supporting element rotated thereby and carrying one or more brake shoes, one or more rock shafts mounted in said support, each having an eccentric for operating on its respective brake shoe, a main operating lever for said rock shaft or shafts, a friction rim, a rotatable element yieldably connected to said supporting element, and an eccentric carried by said rotary element and yoked to said main lever, whereby to operate the same through variation in the relationship between said rotary element and the brake shoe carrying support, substantially as described.

9. An automatic speed governor, comprising a rotary shaft, a supporting element rotated thereby, one or more rock shafts mounted in said supporting element, each having an eccentric portion, a pair of brake shoes of semicircular form carried by said supporting element and having bearing openings in their meeting ends to receive the eccentric portion of their respective rock shaft, a friction rim, a rotatable element yieldably connected to said supporting element, and means controlled by the variation in speed between the supporting element and said rotary element whereby to operate said rock shaft or shafts and cause the contraction or expansion of the brake shoes, substantially as described.

10. An automatic speed governor, comprising a rotary shaft, a supporting element rotated thereby, a friction rim concentric to said shaft, a pair of semi-circular brake shoes arranged to bear on the inside of said friction rim, a pair of semi-circular brake shoes arranged to bear on the outside of said friction rim, rock shafts carried by said supporting element, provided with an eccentric portion operating within the meeting ends of each pair of brake shoes to expand and contract the same, a rotatable element yieldably connected to said supporting element, and means controlled by the variation in speed between the supporting element and said rotary element whereby to operate said rock shafts and cause the contraction or expansion of the brake shoes, substantially as described.

11. An automatic speed governor, comprising a rotary shaft, a supporting element rotated thereby, a friction rim, concentric to said shaft, a pair of semi-circular brake shoes arranged to bear on the inside of said friction rim, a pair of semi-circular brake shoes arranged to bear on the outside of said friction rim, rock shafts carried by said supporting element, provided each with an eccentric portion operating within the meeting ends of each pair of brake shoes to expand and contract the same, rocker arms for said rock shafts, means for connecting said rocker arms, a main operating lever for operating said rock shafts through said connecting means, a rotary element yieldably connected to said supporting element, and means controlled by the variation in speed between the supporting element and said rotary element whereby to engage and move said main lever back and forth according to said variation in speed, substantially as described.

12. An automatic speed governor, comprising a rotary shaft, a supporting element rotated thereby, a friction rim, concentric to said shaft, a pair of semi-circular brake shoes arranged to bear on the friction rim, one or more rock shafts mounted in said supporting element, each having an eccentric portion to work within one of the meeting ends of said brake shoes, and an eccentric portion to work within the meeting end of the other brake shoe, a rotatable element yieldably connected to said supporting element, and means controlled by the variation in speed between the supporting element and said rotary element whereby to operate said rock shafts and cause the contraction or expansion of the brake shoes, substantially as described.

In testimony whereof I affix my signature in presence of two witnesses.

LEVI RHODES.

Witnesses:
D. S. BURKHART,
H. L. HERKELRATH.

---

Copies of this patent may be obtained for five cents each, by addressing the "Commissioner of Patents, Washington, D. C."